United States Patent
Chen et al.

(10) Patent No.: US 9,620,882 B2
(45) Date of Patent: Apr. 11, 2017

(54) BATTERY CONNECTOR AND CONDUCTIVE TERMINAL THEREOF

(71) Applicant: ADVANCED-CONNECTEK INC., New Taipei (TW)

(72) Inventors: Ching-Tien Chen, New Taipei (TW); Shu-Lin Duan, New Taipei (TW); Wei Wan, New Taipei (TW); Ping-Chung Chu, New Taipei (TW); Xiao-Juan Qi, New Taipei (TW)

(73) Assignee: Advanced-Connectek Inc., New Taipei (TW)

( * ) Notice: Subject to any disclaimer, the term of this patent is extended or adjusted under 35 U.S.C. 154(b) by 0 days.

(21) Appl. No.: 15/013,524

(22) Filed: Feb. 2, 2016

(65) Prior Publication Data
US 2016/0226175 A1    Aug. 4, 2016

(30) Foreign Application Priority Data
Feb. 3, 2015 (CN) .......................... 2015 1 0055150

(51) Int. Cl.
H01R 13/24 (2006.01)

(52) U.S. Cl.
CPC ................................ H01R 13/2428 (2013.01)

(58) Field of Classification Search
CPC ...... H01R 11/18; H01R 13/187; H01R 13/24; H01R 13/2428
USPC .................................. 439/700, 289, 500, 862
See application file for complete search history.

(56) References Cited

U.S. PATENT DOCUMENTS

| 4,778,404 | A | * | 10/1988 | Pass | H01R 13/2428 439/246 |
| 6,572,386 | B1 | * | 6/2003 | Howell | H01R 13/2428 439/66 |
| 7,156,706 | B2 | * | 1/2007 | Brown | H01R 13/2492 439/66 |
| 2008/0286992 | A1 | * | 11/2008 | Tai | H01R 12/57 439/77 |
| 2009/0247004 | A1 | * | 10/2009 | Lou | H01R 13/2442 439/500 |
| 2012/0194173 | A1 | * | 8/2012 | Takahashi | G01R 1/06716 324/149 |

* cited by examiner

*Primary Examiner* — Tulsidas C Patel
*Assistant Examiner* — Marcus Harcum
(74) *Attorney, Agent, or Firm* — Muncy, Geissler, Olds & Lowe, P.C.

(57) ABSTRACT

A battery connector includes an insulated housing and conductive terminals. The insulated housing includes slots. The conductive terminals are disposed in the slots, respectively. Each conductive terminal includes an elastic connecting portion, a contacting portion, and a fixing portion. The elastic connecting portion includes elastic arms and connecting portions. Each elastic arm is obliquely extending leftwards and rightwards, separated from each other, and arranged sequentially. The connecting portions are formed at two sides of the elastic arms, where each elastic arm forms a rectangular structure by being enclosed from one end to the other end. The contacting portion extends beyond one side of the corresponding slot. The contacting portion includes a bent contacting portion extending from a front side of the elastic connecting portion and bent backwards. The fixing portion extends from a back side of the elastic connecting portion and extends beyond the other side of the corresponding slot.

10 Claims, 11 Drawing Sheets

BATTERY CONNECTOR AND CONDUCTIVE TERMINAL THEREOF

CROSS-REFERENCES TO RELATED APPLICATIONS

This non-provisional application claims priority under 35 U.S.C. §119(a) on Patent Application No. 201510055150.7 filed in China, P.R.C. on Feb. 3, 2015, the entire contents of which are hereby incorporated by reference.

FIELD OF THE INVENTION

The present disclosure relates to an electric connector, and in particular, to a battery connector and a conductive terminal thereof.

BACKGROUND

A conductive terminal of a common battery connector is designed to be a pogo pin conductive terminal. The pogo pin conductive terminal includes a metal pogo pin, a conductive base, and a compression spring installed inside an insulated housing. The metal pogo pin has a contacting end capable of protruding out of the insulated housing, the conductive base has a junction portion capable of being connected to a circuit board, and the compression spring is disposed between two side walls of the conductive base and has an upper end abutting against an inner wall surface of the metal pogo pin and a lower end being in contact with the conductive base.

When the contacting end of the metal pogo pin is pressed into the insulated housing under an external force, the compression spring can be pushed and deform elastically, and an abutting end of the metal pogo pin is in contact with side arms on the two side walls of the conductive base, thereby achieving the purpose of electrical connection. However, the members are not formed integrally, and during assembly, a long time and a machining process are required to install the compression spring between the metal pogo pin and the conductive base. In addition, during installing the compression spring, the metal pogo pin and the conductive base would be bounced out by the compression spring so that the compressive spring cannot be installed in the insulated housing conveniently. Therefore, how to solve the problem of the traditional structure should be considered by persons skilled in the art.

SUMMARY OF THE INVENTION

In view of the above problems, one embodiment of the present disclosure provides a conductive terminal of a battery connector. The conductive terminal comprises an elastic connecting portion, a contacting portion, and a fixing portion. The elastic connecting portion includes a plurality of elastic arms and a plurality of connecting portions. The elastic arms are obliquely extending leftwards and rightwards, separated from each other and arranged sequentially. The connecting portions are formed at two sides of the elastic arms, where each of the elastic arms forms a rectangular structure by being enclosed from one of two ends thereof to the other end thereof. The contacting portion includes a bent contacting portion extending from a front side of the elastic connecting portion and bent backwards. The fixing portion extends from a back side of the elastic connecting portion.

In an embodiment, the contacting portion includes a contacting arm formed at an end of the bent contacting portion and turned to extend.

In an embodiment, each of the connecting portions includes an adapting section and a plurality of extending sections. The adapting section is extending from a side end of the elastic arm and turning to a side end of another elastic arm. The extending sections are extending from two sides of the adapting section toward a direction away from the side ends of the elastic arms.

In an embodiment, the contacting portion includes a contacting arm formed at an end of the bent contacting portion, and the contacting arm extends to the adjacent fixing portion to contact the elastic connecting portion. The contacting arm corresponds to and is capable of being in contact with the adapting section and the extending sections.

In an embodiment, a left distance and a right distance are formed between the elastic arm obliquely extending leftwards and the adjacent elastic arm obliquely extending rightwards, where the left distance is smaller than the right distance.

In an embodiment, the contacting portion includes a bump structure formed on a contacting side end of the bent contacting portion.

In an embodiment, the contacting portion includes a stop section extended and protruded from a side end of the bent contacting portion.

The present disclosure also provides a battery connector, comprising an insulated housing and a plurality of conductive terminals. The insulated housing includes a plurality of slots, a plurality of front openings, and a plurality of back openings, where each of the front openings is in communication with a front side of the corresponding slot and each of the back openings is in communication with a back side of the corresponding slot. The conductive terminals are disposed in the slots, respectively. Each of the conductive terminals includes an elastic connecting portion, a contacting portion, and a fixing portion. The elastic connecting portion includes a plurality of elastic arms and a plurality of connecting portions. The elastic arms are obliquely extending leftwards and rightwards, separated from each other and arranged sequentially. The connecting portions are formed at two sides of the elastic arms, where each of the elastic arms forms a rectangular structure by being enclosed from one of two ends thereof to the other end thereof. The contacting portion extends beyond the corresponding front opening. The contacting portion includes a bent contacting portion extending from a front side of the elastic connecting portion and bent backwards. The fixing portion extends from a back side of the elastic connecting portion and extends through and beyond the corresponding back opening.

In an embodiment, the fixing portion includes a fixing sheet engaged in the corresponding slot and a soldering leg extending from a back side of the fixing sheet beyond the corresponding back opening.

To sum up, the conductive terminal is of a spring type structure having a rectangular structure, thereby ensuring the conductive terminal can be telescoped in an electronic product and improving the structural reliability. In addition, multiple elastic arms are formed a spring type arm structure having forward and reverse V-shaped members sequentially wrapped, thereby forming multiple elastic arm members to increase the elastic force, which achieves effective compression and improves the elastic force of the conductive terminal, ensures the conductive terminal to contact the battery firmly even in strenuous vibration environment, and improves the product stability of the battery connector.

Moreover, in the contacting portion, the contacting arm is extended and in contact with the elastic arm adjacent to the fixing portion. Electricity is transmitted in a shortest path from the contacting arm to the fixing portion, thereby shortening the path for electricity transmission and increasing a normal force for contacting the battery. Furthermore, the elastic connecting portions are sequentially arranged and disposed in the slots, thereby saving the assembly cost, reducing the product volume, and effectively improving the space utilization of the slots, which facilitate the product design of lightening and thinning and satisfy different use requirements.

Detailed features and advantages of the present disclosure are described in the detailed description below, which is sufficient for any persons skilled in the art to understand and implement the technical content of the present disclosure. Any persons skilled in the art can easily understand the objectives and advantages of the present disclosure according to the disclosure, the claims and the accompanying drawings of this specification.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
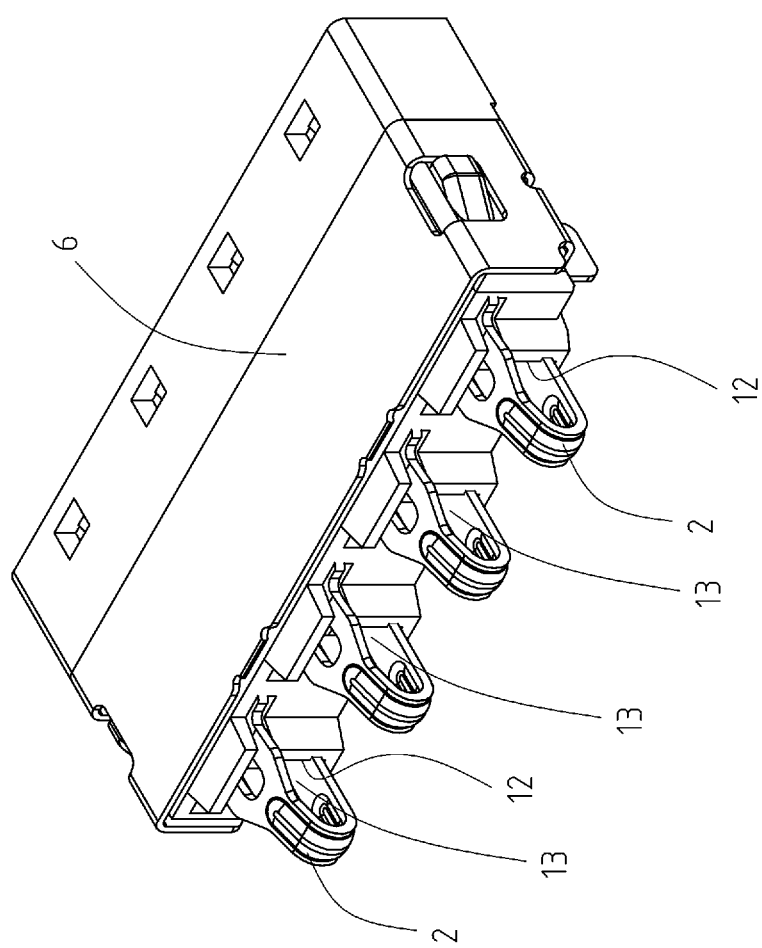
FIG. 1 illustrates a schematic exterior front view of a battery connector according to a first embodiment of the present disclosure.
Figure 2:
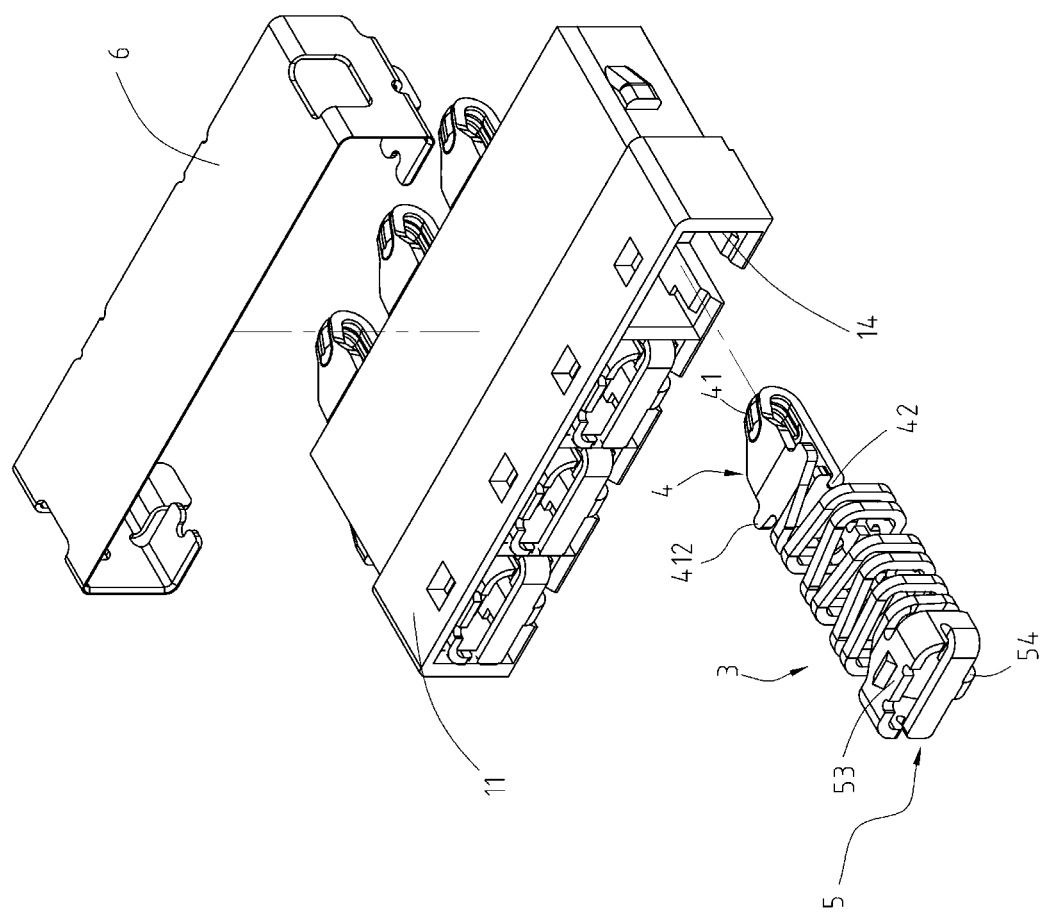
FIG. 2 illustrates a schematic exploded back view of the battery connector according to the first embodiment of the present disclosure.
Figure 3:
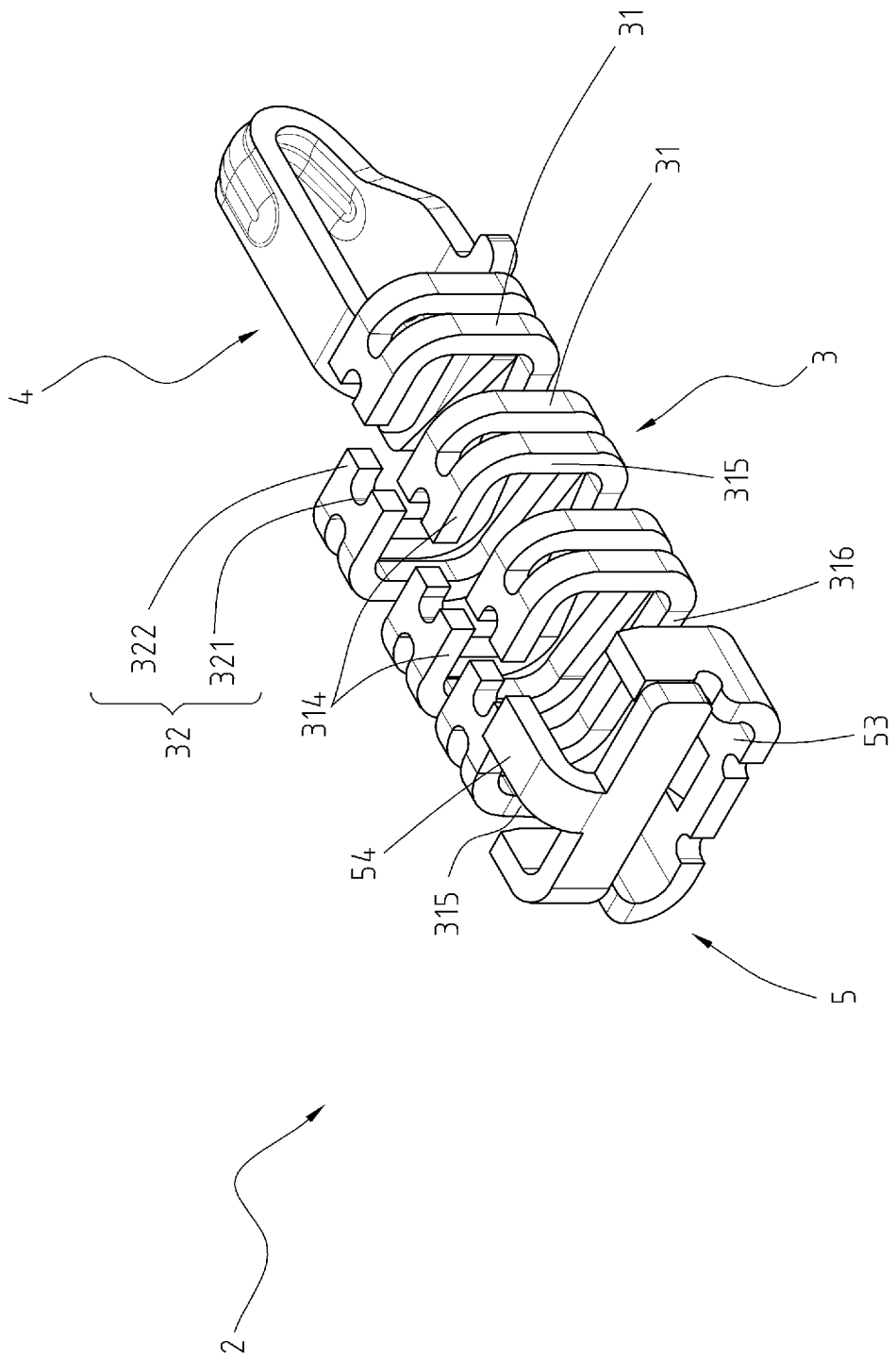
FIG. 3 illustrates a schematic exterior view of a conductive terminal according to the first embodiment of the present disclosure.

Referring to FIG. 1, FIG. 2, and FIG. 3, a first embodiment of the present disclosure is shown. FIG. 1 is a schematic exterior front view, FIG. 2 is a schematic exploded back view of FIG. 1, and FIG. 3 is a schematic exterior view of a conductive terminal. A battery connector 100 of the present disclosure is applicable to battery connection of products such as smart phones. The battery connector 100 comprises an insulated housing 11 and a plurality of conductive terminals 2, where a shell 6 covers the insulated housing 11, fixing sheets are extended from two sides of the shell 6 and can be soldered on a circuit board for fixing the battery connector 100 to the circuit board (not shown).

Figure 4:
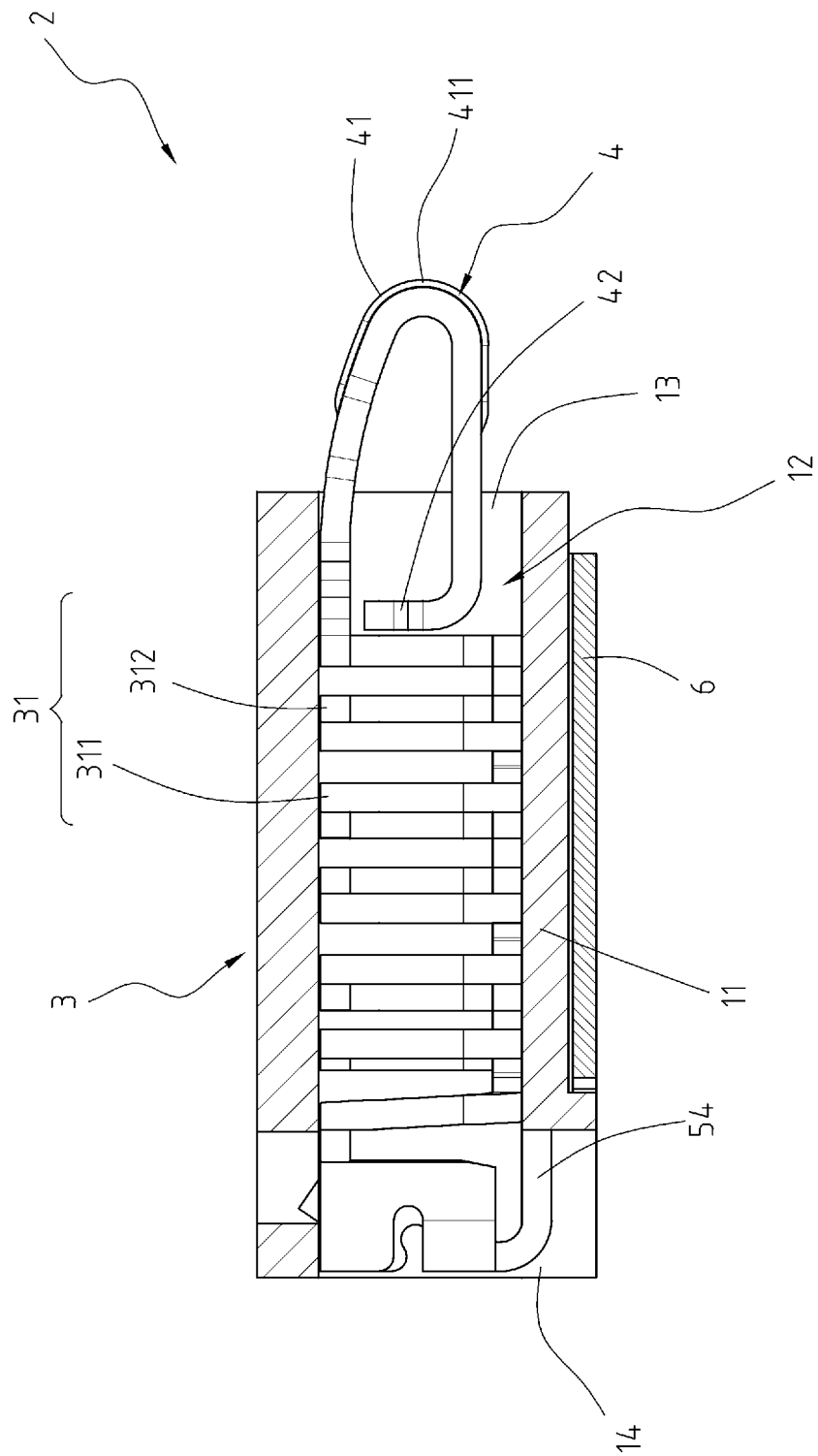
FIG. 4 illustrates a schematic sectional side view of the battery connector according to the first embodiment of the present disclosure.

Referring to FIG. 1, FIG. 2, and FIG. 4, the insulated housing 11 is a rectangular base and includes a plurality of slots 12, a plurality of front openings 13, and a plurality of back openings 14. The slots 12 are sequentially arranged from left to right on the insulated housing 11 and separated from each other, each of the front openings 13 is connected to a front side of the corresponding slot 12, and each of the back openings 14 is connected to a back side of the corresponding slot 12.

Figure 5:
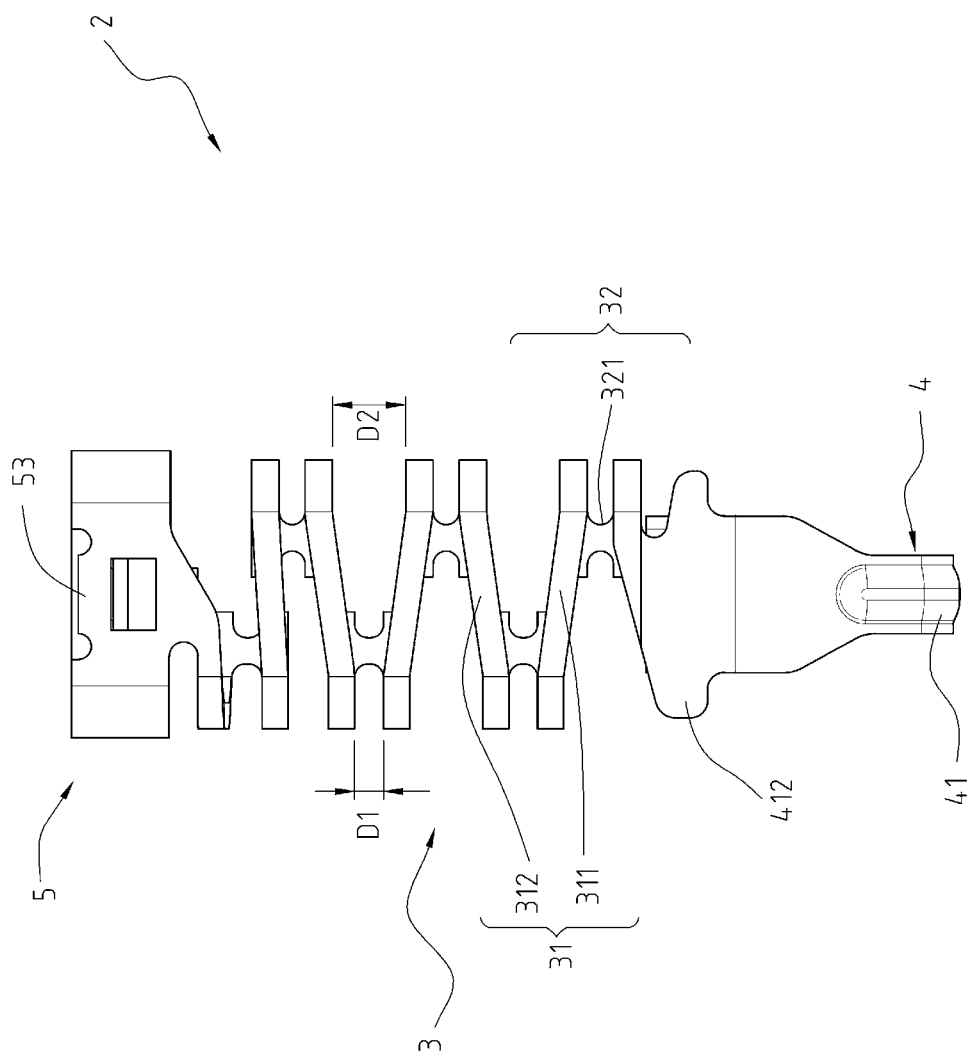
FIG. 5 illustrates a schematic top view of the conductive terminal according to the first embodiment of the present disclosure.

Referring to FIG. 2, FIG. 3, and FIG. 4, the conductive terminals 2 are each made from a plate through stamping, bending and the like. Each of the conductive terminals 2 includes an elastic connecting portion 3, a contacting portion 4, and a fixing portion 5, which are integrally formed. The elastic connecting portion 3 is installed in the corresponding slot 12 and includes a plurality of elastic arms 31 and a plurality of connecting portions 32. The elastic arms 31 include a plurality of elastic arms 311 obliquely extending leftwards and a plurality of elastic arms 312 obliquely extending rightwards, which are separated from each other and formed sequentially (as shown in FIG. 5). A left distance D1 and a right distance D2 are formed between each of the elastic arms 311 obliquely extending leftwards and the adjacent elastic arm 312 obliquely extending rightwards, where the left distance D1 is smaller than the right distance D2. The distance between the elastic arm 311 obliquely extending leftwards and the adjacent elastic arm 312 obliquely extending rightwards is gradually wider. The elastic arm 311 obliquely extending leftwards is designed obliquely so that a right side thereof is in a lower part and a left side thereof is in an upper part. The elastic arm 312 obliquely extending rightwards is designed obliquely so that a right side thereof is in an upper part and a left side thereof is in a lower part. That is to say, viewed from the top of the elastic connecting portion 3, the elastic arm 311 obliquely extending leftwards and the elastic arm 312 obliquely extending rightwards are each of a V-shaped structure (as shown in FIG. 5). Moreover, a first elastic arm 311 obliquely extending leftwards turns to an elastic arm 312 obliquely extending rightwards and then the elastic arm 312 obliquely extending rightwards turns to a second elastic arm 311 obliquely extending leftwards, and so on. That is, a configuration having repeated and alternated forward and reverse V-shaped structures is formed.

Figure 6:
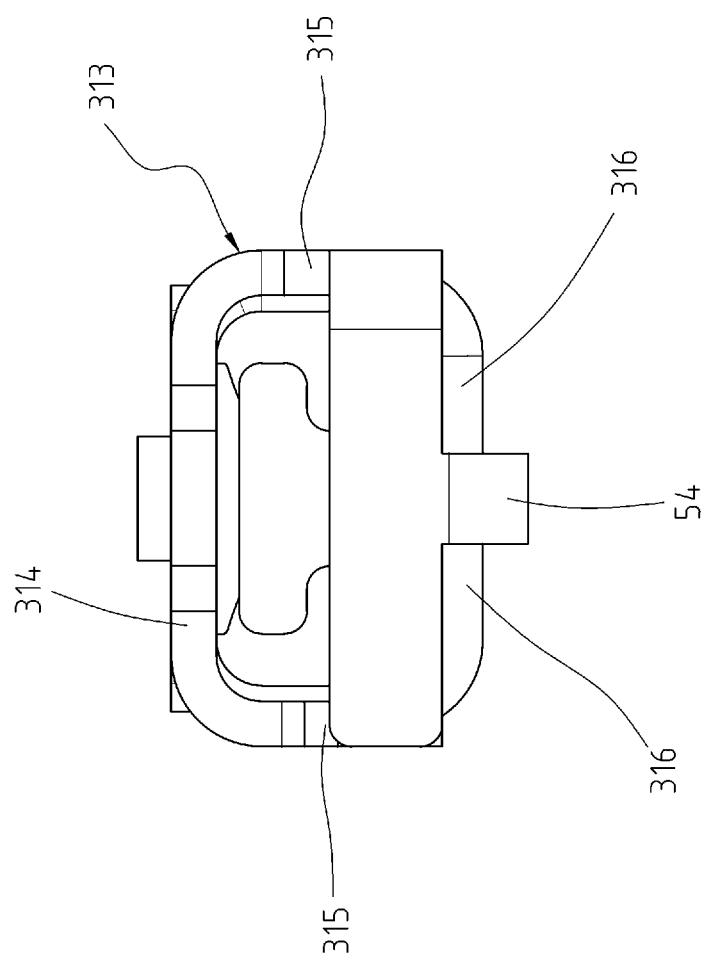
FIG. 6 illustrates a schematic back view of the conductive terminal according to the first embodiment of the present disclosure.

Referring to FIG. 2, FIG. 3, and FIG. 6, each of the elastic arms 31 forms a rectangular structure 313 by being enclosed from one of two ends thereof to the other end thereof. That is, viewed from the front of the elastic connecting portion 3, each of the elastic arms 31 forms a rectangular box-shaped structure in the corresponding location. That is, each elastic arm 31 includes a rectangular structure 313 defined by a top rod 314, side rods 315 extending downwards from two sides of the top rod 314, and bottom rods 316 extending oppositely inwards from bottoms of the side rods 315. Moreover, the connecting portions 32 are formed at two sides of the elastic arms 31, that is, a bottom rod 316 at a first side of a second elastic arm 31 is extended from a bottom rod 316 of a first elastic arm 31 through a first connecting portion 32, and a bottom rod 316 of a third elastic arm 31 is extended from a bottom rod 316 at a second side of the second elastic arm 31 through a second connecting portion 32, where the first side is opposite to the second side. That is, the elastic connecting portion 3 is defined by the elastic arms 31 and the connecting portions 32 to form a structure having spring structures sequentially connected in a tail-to-end manner.

Figure 8:
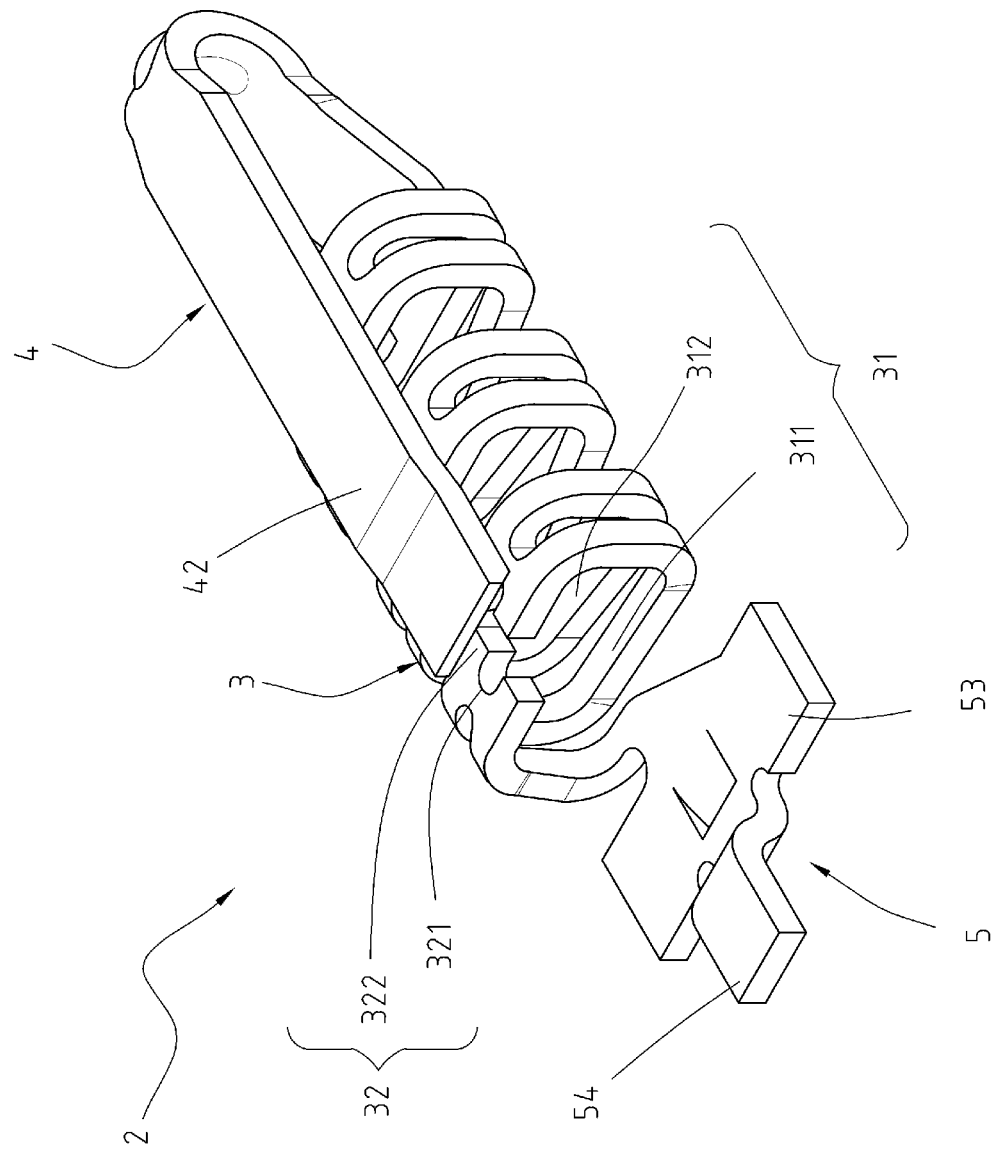
FIG. 8 illustrates a schematic exterior back view of the conductive terminal according to the second embodiment of the present disclosure.

Referring to FIG. 3 and FIG. 8, each of the connecting portions 32 is made through stamping rather than bending. Each connecting portion 32 is of a U-shaped or H-shaped structure when viewed laterally. Each connecting portion 32 is formed at two sides of the corresponding elastic arm 31, that is, a connecting portion 32 is formed between the neighboring sides of two adjacent elastic arms 31.

Referring to FIG. 3, in an example where each connecting portion 32 is of an H-shaped structure, the connecting portion 32 includes an adapting section 321 and a plurality of extending sections 322. The adapting section is extending from a side end of an elastic arm 31 and turning to a side end of another elastic arm 31. The extending sections 322 are extending from two sides of the adapting section 321 toward a direction away from the side ends of the elastic arms 31, so that the side end of the elastic arm 31 is defined by the adapting section 321 and the extending sections 322 together to form the H-shaped structure, where the adapting section 321 and the extending sections 322 are made through stamping. In this embodiment, the adapting section 321 is extending from a side end of the elastic arm 31 and turning to a side end of adjacent elastic arm 31. In some aspects, the connecting portion 32 may be further of a U-shaped structure, that is, the two extending sections 322 are omitted, so that the side end of the elastic arm 31 is defined by the adapting section 321 to form a U-shaped structure.

Referring to FIG. 2, FIG. 4, and FIG. 5, when the elastic arms 313 are formed as the rectangular structures 313, more elastic arms 31 are allowed to be arranged within one conductive terminal 2 having a predetermined length, thereby improving elasticity of the elastic connecting portion 3 of the conductive terminal 2. When the contacting portion 4 is pressed by a battery, since the contacting portion 4 is linked to the elastic connecting portion 3, the contacting portion 4 can elastically press against the battery with a certain elastic force provided by the elastic connecting portion 3. Therefore, the contacting portion 4 can be in contact with a conductive piece of the battery firmly. The contacting portion 4 can still be in contact with the battery closely even when the contacting portion and the battery are shaken, thus improving the structural reliability of the battery connector 100.

In other words, multiple elastic arms 31 are formed a spring type arm structure having rectangular structures 313, thereby achieving effective compression and improving the elastic force of the conductive terminal 2, which ensure the conductive terminal 2 to be in contact with the battery firmly even in strenuous vibration environment, and thus improving the product stability of the battery connector 100. As shown, the spring type arm structure has several elastic arm members to increase the elastic force of the elastic conducting portion 3.

Referring to FIG. 2, FIG. 3, and FIG. 6, for the spring type arm structure, the box-shaped structures each defined by the top rod 314 and two side rods 315 of the rectangular structure 313 can ensure stable telescopic effect of the conductive terminal 2 in the insulated housing 11 to be performed and can improve the space utilization rate within the insulated housing 11. In this embodiment, when viewed laterally from each of the conductive terminals 2 in each side, six side rods 315 are aligned with one another to provide a spring type structure having several force arm members. Therefore, the conductive terminal 2 is elastically compressible and recoverable, and the conductive terminal 2 can be in contact with the battery firmly in strenuous vibration environment. Therefore, the product stability of the battery connector 100 is enhanced.

Referring to FIG. 5 and FIG. 6, viewed from the top of each of the conductive terminals 2, seven elastic arms 31 are arranged along the length direction of the conductive terminal 2, where five elastic arms 31 are collectively formed as a zigzag structure having forward and reverse V-shaped structures arranged alternately, the top rod of the elastic arm extended to the contacting portion and the top rod of the elastic arm extended to the fixing portion are parallel with each other. Viewed from the bottom of the conductive terminal 2 (as shown in FIG. 3 and FIG. 6), two adjacent bottom rods 316 (elastic force arms) are connected by a connecting portion 32 formed in H-shaped.

Referring to FIG. 2, the elastic connecting portions 3 are sequentially arranged and disposed in the slots 12, thereby saving the assembly cost, reducing the product volume, and effectively improving space utilization of the slots 12 of the insulated housing 11, which facilitate the product design of lightening and thinning and satisfy different use requirements.

Referring to FIG. 1, FIG. 2, and FIG. 4, the contacting portions 4 extend beyond the front openings 13 and are adapted to be in contact with the battery. Each of the contacting portions 4 includes a bent contacting portion 41 extending from a front side of the elastic connecting portion 3 and bent backwards, a contacting arm 42 formed at an end of the bent contacting portion 41 and turned to extend, and a bump structure 411 formed on the bent contacting portion 41.

Referring to FIG. 3 and FIG. 4, when viewed laterally the bent contacting portion 41 is of a U-shaped structure and extended from top to bottom so that an arc surface portion is in the front part while an opening faces toward the rear part, i.e., toward the fixing portion 5. The contacting arm 42 is formed by turning a lower end of the bent contacting portion 41 and extending the end upwards. Here, the contacting arm 42 is bent by 90 degrees. After being installed in the slot 12 through the back opening 14, the contacting arm 42 abuts against the inner wall of the front opening 13 to achieve a stop effect, thereby effectively controlling the portion of the contacting portion 4 exposed from the front opening 13 to be in a proper length.

Referring to FIG. 4, the end portion of the bent contacting portion 41 of each of the contacting portions 4 is provided with the bump structure 411 for improving the structural strength, to improve the conductive and contact effect of the contacting portion 4, avoid poor contact between the contacting portion 4 and the battery, and make signal transmission more stable.

Referring to FIG. 2, FIG. 4, and FIG. 5, a stop section 412 is extended and protruded from a side portion of the bent contacting portion 41. During assembly, the stop section 412 abuts against the inner wall of the slot 12 to provide a positioning function, thereby effectively controlling the portion of the contacting portion 4 exposed from the front opening 13 to be in a proper length.

Referring to FIG. 2, FIG. 3, and FIG. 4, each of the fixing portions 5 extends from a back side of the corresponding elastic connecting portion 3 and is exposed out of the corresponding back opening 14. Each fixing portion 5 includes a fixing sheet 53 engaged in the corresponding slot 12 and a soldering leg 54 (aligned in a horizontal manner, named SMT legs, or aligned in a vertical manner, named DIP legs) extending from the back of the fixing sheet 53 beyond the back opening 14.

Figure 7:
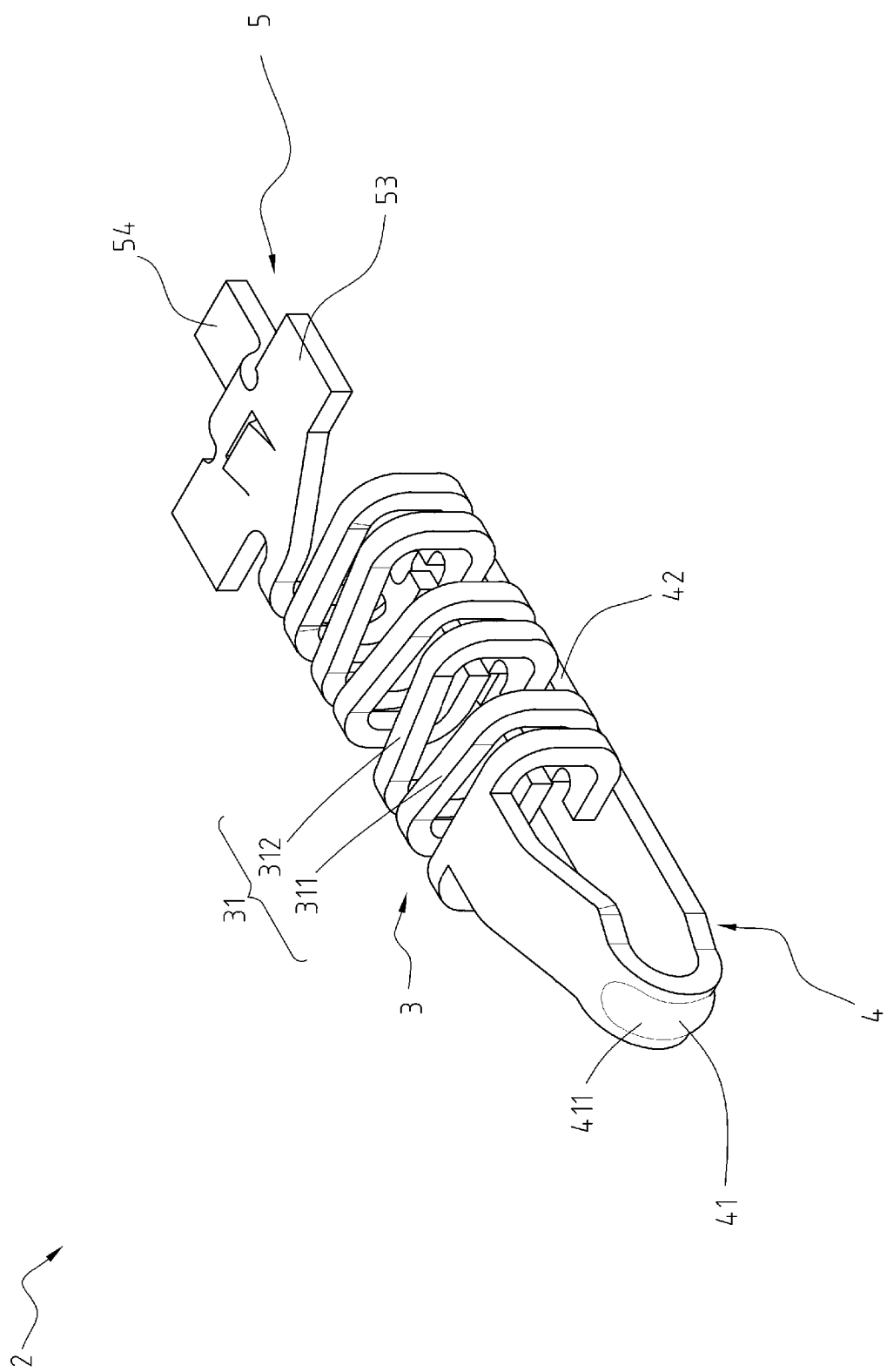
FIG. 7 illustrates a schematic exterior front view of a conductive terminal according to a second embodiment of the present disclosure.
Figure 9:
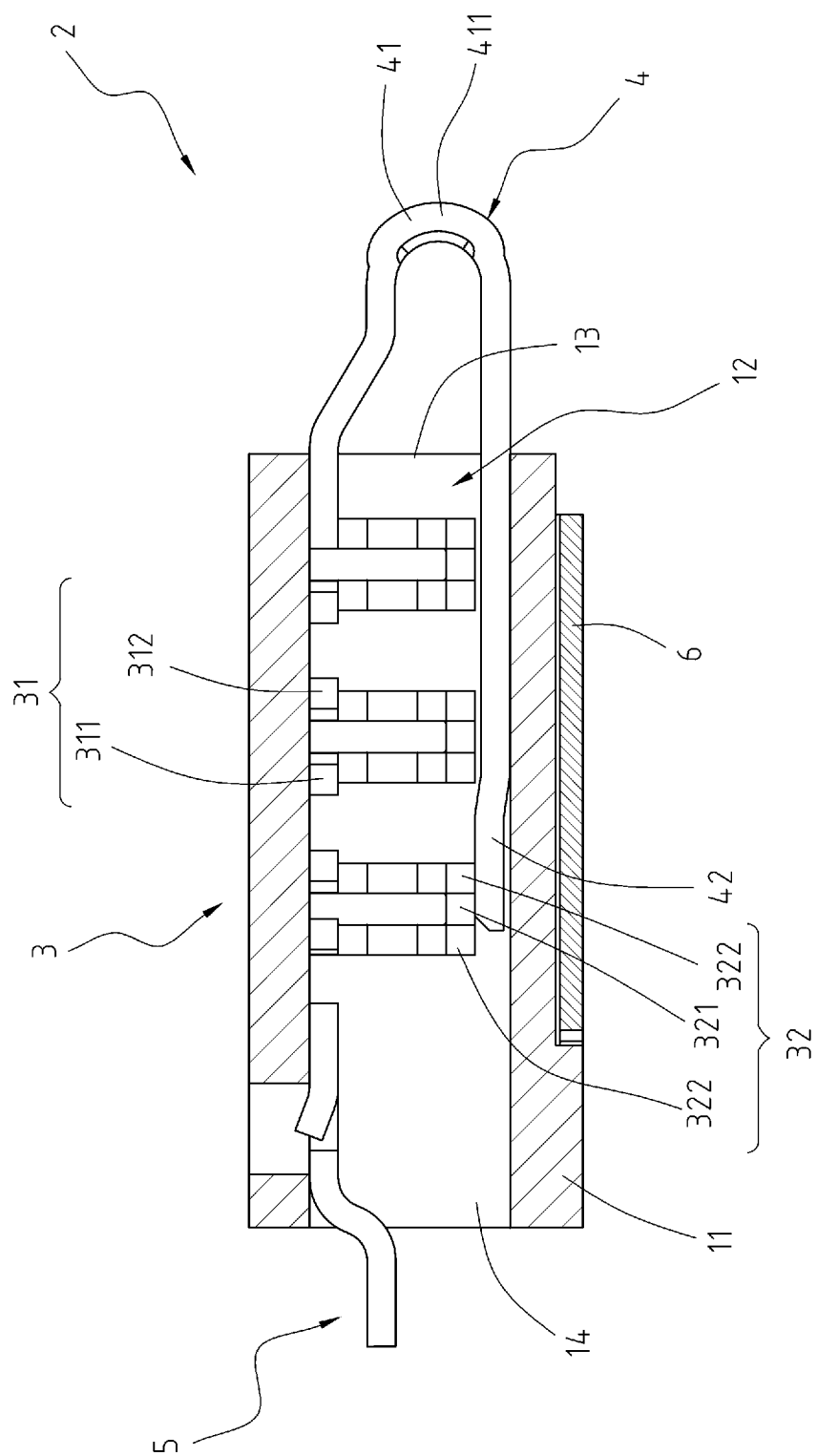
FIG. 9 illustrates a schematic sectional side view of the battery connector according to the second embodiment of the present disclosure.
Figure 10:
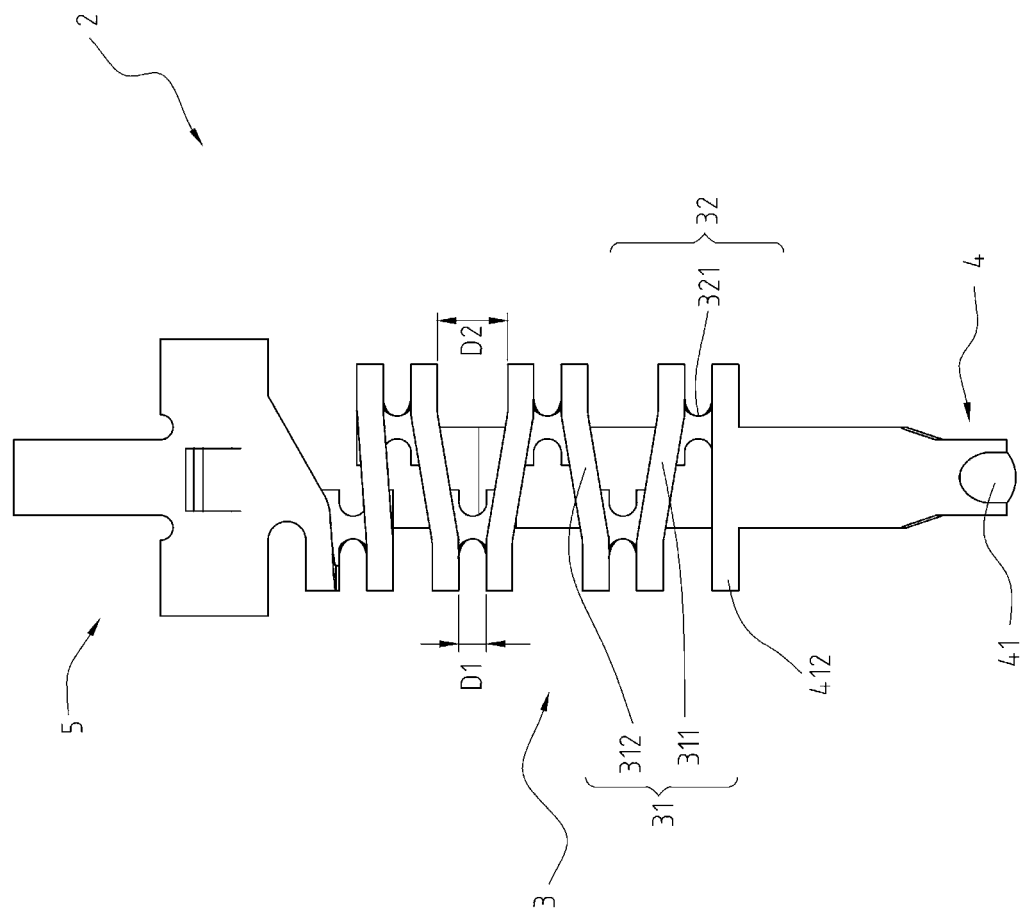
FIG. 10 illustrates a schematic top view of the conductive terminal according to the second embodiment of the present disclosure.
Figure 11:
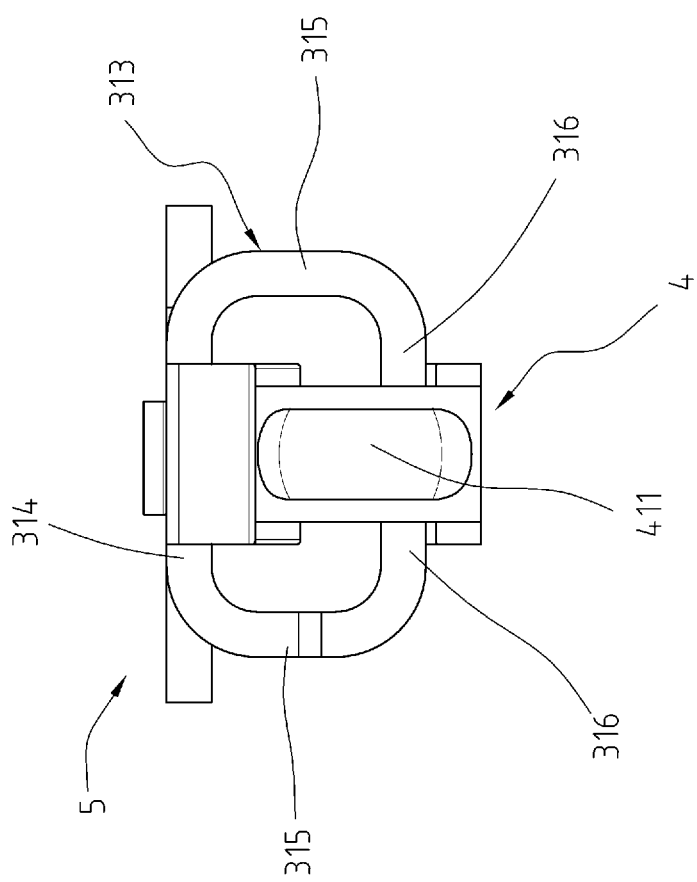
FIG. 11 illustrates a schematic front view of the conductive terminal according to the second embodiment of the present disclosure.

Referring to FIG. 7 to FIG. 11, a second embodiment of the present disclosure is shown. FIG. 7 is a schematic exterior front view of a conductive terminal, FIG. 8 is a schematic exterior back view of the conductive terminal, FIG. 9 is a schematic sectional side view of a battery connector, FIG. 10 is a schematic top view of the conductive terminal, and FIG. 11 is a schematic front view of the conductive terminal. The structure of the second embodiment is approximately the same as that of the first embodiment, except that the contacting portion 4 in this embodiment includes a contacting arm 42 formed at an end of the bent contacting portion 41 and of a strip shape, and the contacting arm 42 is extended to the adjacent fixing portion 5 to be in contact with the elastic connecting portion 3. Here, the contacting arm 42 corresponds to and can contact the adapting section 321 and the extending sections 322 of the elastic connecting portion 3. The elastic connecting portion 3 are in contact with the contacting arm 42 through the adapting section 321 and the extending sections 322 for effective contact and electrical transmission. Here, when the battery is in contact with the contacting portion 4, the contacting portion 4 drives the contacting arm 42, so that the contacting arm 42 is in contact with the adapting section 321 and the extending sections 322. That is, when the contacting portion 4 is not in contact with the battery, the contacting arm 42 of the contacting portion 4 can be designed to be not in contact with the adapting section 321 and the extending sections 322; while when the battery pushes the contacting portion 4, the contacting arm 42 is moved and in contact with the adapting section 321 and the extending sections 322, but the present disclosure is not limited thereto. In some aspects, the contacting arm 42 of the contacting portion 4 may be in contact with the adapting section 321 and the extending sections 322 no matter the battery is in contact with the contacting portion 4 or not. The contacting arm 42 of the contacting portion 4 is extended toward and in contact with the elastic arm 31 adjacent to the fixing portion 5, so that when the contacting portion 4 is in contact with the battery and transmits electricity, the electricity is transmitted in a shortest path from the contacting arm 42 to the fixing portion 5. Since the electricity signal would choose the shortest path, a path formed by unfolding the elastic arms 31 is rather long, so the electricity signal would be transmitted from the contacting portion 4 to the fixing portion 5 through the contacting arm 42. Therefore, the electricity transmission path can be reduced, and the normal force provided by the battery connector 100 can be increased.

In the present disclosure, the conductive terminals are of a spring type structure having a rectangular shape to ensure the conductive terminals can be telescoped in an electronic product and improving the structural reliability. In addition, multiple elastic arms are formed a spring type arm structure having forward and reverse V-shaped members sequentially wrapped, thereby forming multiple elastic force arm members to increase the elastic force, which achieves effective compression and improves the elastic force of the conductive terminals, ensures the conductive terminals to be in contact with the battery firmly even in strenuous vibration environment, and improves the product stability. Moreover, in the contacting portion, the contacting arm is extended and in contact with the elastic arm adjacent to the fixing portion. Electricity is transmitted in a shortest path from the contacting arm to the fixing portion, thereby shortening the path for electricity transmission and increasing the normal force for contacting the battery. Furthermore, the elastic connecting portions are sequentially arranged and disposed in the slots, thereby saving the assembly cost, reducing the product volume, and effectively improving the space utilization of the slots, which facilitate the product design of lightening and thinning, and satisfy different use requirements.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A conductive terminal of a battery connector, comprising:
    an elastic connecting portion, including a plurality of elastic arms and a plurality of connecting portions, wherein the elastic arms includes a plurality of first elastic arms obliquely extending leftwards and a plurality of second elastic obliquely extending rightwards, the first elastic arms and the second elastic arms are separated from each other and arranged sequentially, the connecting portions are formed at two sides of the elastic arms, and each of the elastic arms forms a rectangular structure by being enclosed from one of two ends thereof to the other end thereof;
    a contacting portion, including a bent contacting portion extending from a front side of the elastic connecting portion and bent backwards; and
    a fixing portion, extending from a back side of the elastic connecting portion.

2. The conductive terminal of the battery connector according to claim 1, wherein the contacting portion includes a contacting arm formed at an end of the bent contacting portion and turned to extend.

3. The conductive terminal of the battery connector according to claim 1, wherein each of the connecting portions includes an adapting section and a plurality of extending sections, the adapting section is extending from a side end of the elastic arm and turning to a side end of another one of the elastic arms, the extending sections are extending from two sides of the adapting section toward a direction away from the side ends of the elastic arms.

4. The conductive terminal of the battery connector according to claim 3, wherein the contacting portion includes a contacting arm formed at an end of the bent contacting portion, and the contacting arm extends to the adjacent fixing portion to contact the elastic connecting portion and the contacting arm corresponds to and is capable of being in contact with the adapting section and the extending sections.

5. The conductive terminal of the battery connector according to claim 1, wherein a left distance and a right distance are formed between each of the first elastic arms obliquely extending leftwards and the adjacent one of the second elastic arms obliquely extending rightwards, wherein the left distance is smaller than the right distance.

6. The conductive terminal of the battery connector according to claim 1, wherein the fixing portion includes a fixing sheet and a soldering leg extending from a back side of the fixing sheet.

7. The conductive terminal of the battery connector according to claim 1, wherein each of the elastic arms includes a top rod, a plurality of side rods, and a plurality of bottom rods, wherein the side rods are extending downwards from two sides of the top rod, and the bottom rods are extending oppositely from bottoms of the side rods, and wherein the top rod, the side rods, and the bottom rods define a rectangular structure.

8. The conductive terminal of the battery connector according to claim 1, wherein the contacting portion includes a stop section extending and protruding from a side end of the bent contacting portion.

9. A battery connector, comprising:
- an insulated housing including a plurality of slots, a plurality of front openings, and a plurality of back openings, wherein each of the front openings is in communication with a front side of the corresponding slot and each of the back openings is in communication with a back side of the corresponding slot; and
- a plurality of conductive terminals of a battery connector according to claim 1, wherein each of the conductive terminals is disposed in the corresponding slot of the insulated housing, the contacting portion of each of the conductive terminals extends beyond the corresponding front opening, and the fixing portion of each of the conductive terminals extends beyond the corresponding back opening.

10. The battery connector according to claim 9, further comprising a shell covering the insulated housing.

\* \* \* \* \*